United States Patent

[11] 3,562,472

| [72] | Inventors | Maurice W. Cannon;<br>Jerome B. Tankersley, III, Roanoke, Va. |
|---|---|---|
| [21] | Appl. No. | 851,603 |
| [22] | Filed | Aug. 20, 1969 |
| [45] | Patented | Feb. 9, 1971 |
| [73] | Assignee | General Electric Company<br>a corporation of New York |

[54] INDUCTION HEATER FOR ROTATING GODET
5 Claims, 4 Drawing Figs.

[52] U.S. Cl................................................. 219/10.61,
   219/469, 219/470, 219/10.49; 336/212, 336/234
[51] Int. Cl..................................................... H05b 5/00,
   H05b 9/06
[50] Field of Search......................................... 219/10.61,
   469, 470, 471, (Inquired); 336/120, 212, 234

[56] References Cited
UNITED STATES PATENTS

| 1,394,901 | 10/1921 | Hobart......................... | 336/120 |
| 3,328,735 | 6/1967 | Honsinger.................... | 336/120 |
| 2,541,416 | 2/1951 | Harrison...................... | 219/10.49 |
| 3,200,230 | 8/1965 | La Bretoniere............... | 219/10.49 |
| 3,412,228 | 11/1968 | Miyagi........................ | 219/10.61 |

Primary Examiner—A. Bartis
Assistant Examiner—L. H. Bender
Attorneys—John B. Sponsler, Gerald R. Woods, Frank L. Neuhauser, Oscar B. Waddell, Joseph B. Forman and Arnold E. Renner ABSTRACT: An induction heater for heating a rotating godet in a synthetic fiber processing device, the heater having a tubular, radially laminated magnetic core clamped between two transversely laminated, circular end flanges of magnetic material having inset portions extending over the ends of the core and an alternating current excited winding filling the space between the flanges, the tubular core also being aligned with openings in the flanges permitting the passage of a shaft therethrough for supporting and rotating a cylindrical godet, which surrounds the lateral surface and one end of the heater by which hysteresis and eddy currents are induced in the godet, the core laminations preventing induced heating of the core, and the circular flanges preventing the magnetic flux drag between the core and the godet.

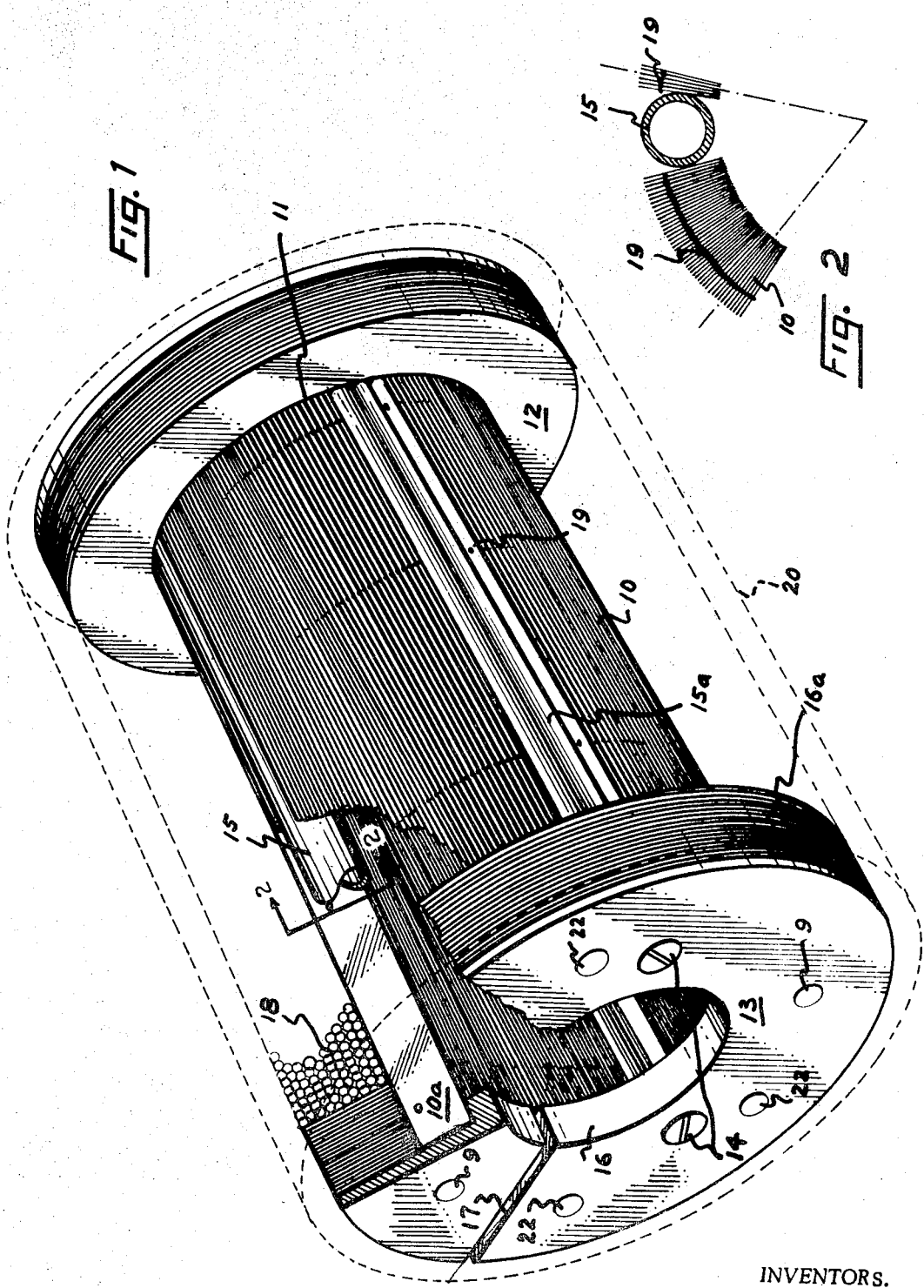

INVENTORS.
MAURICE W. CANNON
JEROME B. TANKERSLEY, III

INDUCTION HEATER FOR ROTATING GODET

BACKGROUND OF THE INVENTION

In the processing of synthetic fibers heat is supplied to the fibers by passing them over, and in contact with, a rotating "godet" or heated roll. The godet normally is heated electrically, and although resistance type heaters have been used, inductive heaters are preferred because of their better heating control characteristics.

Induction heaters normally have a core of magnetizable material or metal, such as iron, shaped into an H, or a U, together with a suitable winding, which is energized by alternating current, to induce hysteresis and eddy currents in the walls of the godet surrounding the heater. Structures of this type are illustrated in U.S. Pats. Nos. 2,541,416 and 3,200,230, for example. The ends, or poles, of the core structure are arranged in close proximity to the inner lateral surface of the godet, which is rotated axially around the heater to transport the synthetic fibers over its outer lateral surface and to assist in obtaining uniform heating of the godet.

Prior art induction heaters of the type noted above have had two notable deficiencies; namely, undesirable induced heating of the core structure itself and magnetic drag between the rotating godet and the core structure. In some instances it has been determined that twice as much power is required to rotate the godet when the heater winding is energized as when it is not energized.

SUMMARY OF THE INVENTION

The present invention is directed to the provision of an improved induction heater construction for a rotating godet, or the like, wherein the induced heating of the core is prevented by unique arrangement of laminations and the magnetic drag between the core and the rotating godet is eliminated by specially shaped circular poles at the ends of the core for coacting with the godet. Another feature of the invention is the provision of a unique heater construction adapted to be made in various sizes and capacities using the same basic components.

BRIEF DESCRIPTION OF THE DRAWING

FIG. 1 is a perspective view of the improved induction heater having certain parts broken away and showing in dotted lines a phantom outline of a godet surrounding the heater.

FIG. 2 is a sectional view along the line 2-2 of FIG. 1 directed to the unique radial laminations of the central component of the core structure of the heater.

DESCRIPTION OF THE PREFERRED EMBODIMENT

Figure 3:
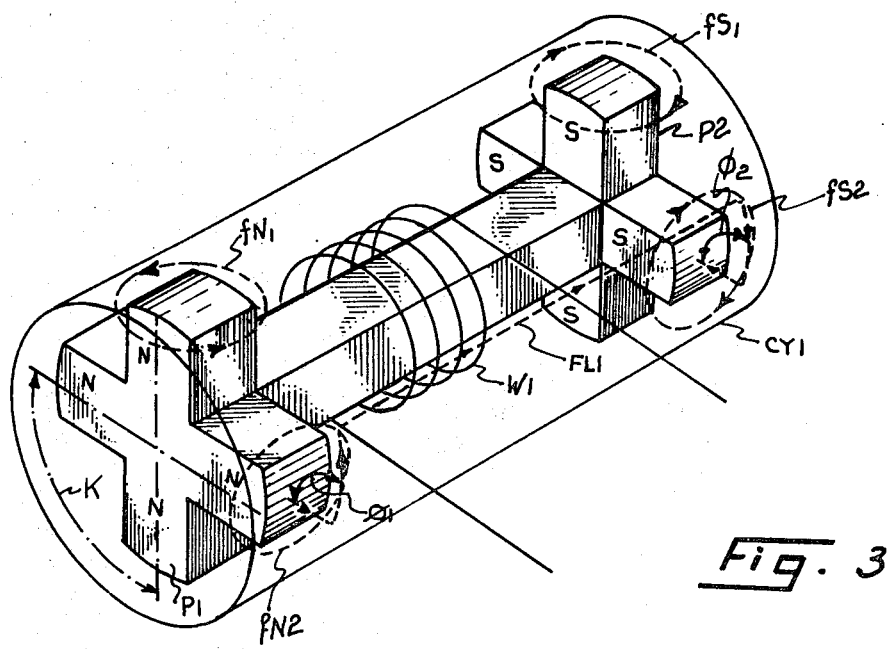
FIGS. 3 and 4 are perspective views illustrating the principles of induction heaters useful in the understanding of the present invention.

With reference to FIG. 1 the induction heater resembles a spoollike structure having a central core portion 10 with a flange 12 attached to and extending over one end of the portion 10 as indicated by 11 which represents an inset of the flange 12. A similar arrangement is provided at the other end of the core portion 10 in respect to flange 13, this factor being further illustrated by the difference in thicknesses of flange 13 at 16 and 16a.

The core portion 10 is made up of laminar elements 10a arranged within the insets (see at 11 of flange 12) of flanges 12 and 13, the laminar elements 10a being interspersed by hollow rods 15 and 15a through the latter of which screws 14 extend from the flanges for clamping them to the core portion 10. Laminar elements 10a (see also FIG. 2) are provided with punched-out projections, or nodules, 19 in order to provide radial stacking of these elements within the insets of the flanges 12 and 13, and each element 10a is coated with an insulating layer. A winding 18 is provided between the flanges 12 and 13 around the core portion 10, leads from this winding being brought out through the hollow rod 15, for example (not shown).

The flanges 12 and 13 are each made from pluralities of thin, circular discs, each of the discs being precoated with insulation, the discs being held together, for example, by means of rivets 22. Each flange also has a transverse slot 17, as shown in the drawing of flange 13 of FIG. 1, for interrupting the annular continuity of the flange structure. The insulating coating on the laminar elements 10a and on the discs forming the flanges 12 and 13, together with the slot 17 in each flange, effectively prevent the building up of induced currents in the core 10 and the flanges 12 and 13, thereby holding the hysteresis and eddy current losses in the heater to a minimum.

Although early heater rolls (see U.S. Pat. No. 607,093) rotated the heater and the roll together, modern induction heated rolls are normally heated from a stationary induction heater about which a godet is revolved or rotated thereby obviating the necessity of having heavy currents to be carried by slip rings (as in the patent referred to immediately above).

Also, as previously mentioned above, the induction heaters for the most part utilize cores of the H or U shapes, or similar construction, with the ends of the core coacting inclose proximity with the wall of the godet. Referring now to FIG. 3 there is illustrated a core C1 having a winding W1 and four poles at each end of the core, representing pole assembly P1 and pole assembly P2. A cylinder CY1 of magnetic material, similar to a heater roll, or godet, is also illustrated as rotating around the core C1 and the assemblies P1 and P2 in a counterclockwise direction.

It is obvious that if current is applied to the winding W1, current will be induced in the wall of the cylinder CY1. However, since the cylinder is rotating lines of force at some instant will flow out of the top North pole of flange P1 into the wall of cylinder CY1 (see dotted line) and thence to the corresponding top South pole of flange P2. It is to be noted that the flux line FL1 is sharply bent at an angle $\theta$, in leaving the North pole of flange P1 and similarly in returning to the South pole of flange P2 at an angle of $\theta_2$. This effect is known as magnetic drag, and in some instances its total effect has resulted in the power required to rotate a godet when its heater is energized to be increased by as much as 100 percent.

The magnetic drag effect may be better understood by reference to the "dot-dash" lines of FIG. 3 of the drawings. For example, $fN_1$ represents a current loop produced by the flux leaving a North pole of the pole assembly P1, $fN_2$ representing another current loop produced by flux leaving another North pole of the pole assembly P1, and $fS_1$ representing a current loop produced by flux returning to a South pole of pole assembly P2. These current loops are generated in the shell of the godet, or cylinder CY1, and the godet in rotating must overcome the retarding forces of all these loops of current —for example, in FIG. 3 there would be eight different loops, four by the North poles and four by the South poles.

It is to be noted that the circumferential distance $k$ between any adjacent North or South poles, if reduced sufficiently to cause the respective current loops of those poles to overlap slightly, would bring about cancellation of these currents since they are of opposite direction at any moment; consequently, the magnetic drag would be eliminated.

Figure 4:
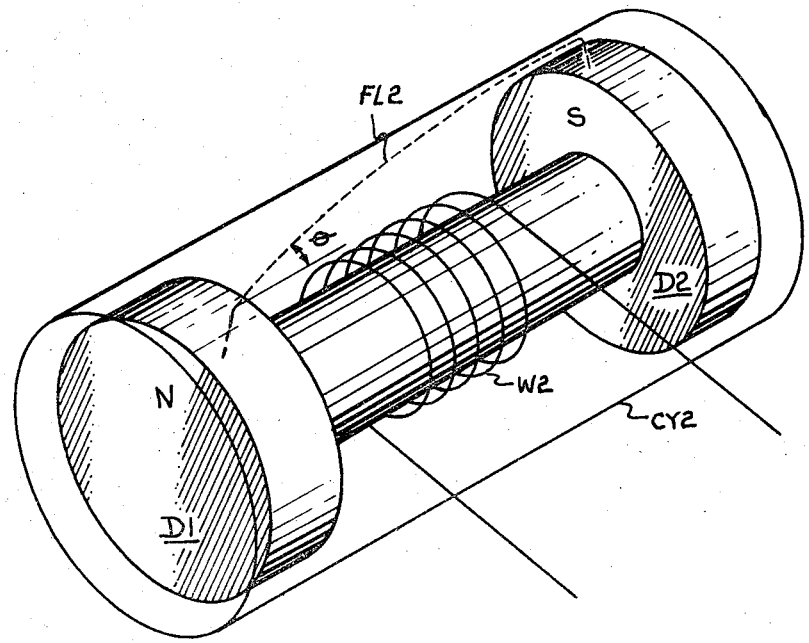

The present invention, however, has overcome the problem of magnetic drag by providing flanges at each end of its induction heater core that are continuous; i.e., the continuity of the pole surface presented to the wall of the godet as shown as 20 in FIG. 1 as it is rotated is unchanging, and the opposing current loops automatically cancel each other. FIG. 4 is illustrative of this feature showing continuous flanges D1 and D2 provided on a core C2 having a winding W2 and coacting with a cylinder CY2. In this type of induction heater the magnetic drag is almost eliminated altogether since a flux line FL2, for example, is merely skewed by a slight angle $\theta$ rather than being bent through a substantial range as with the arrangement of FIG. 3 previously discussed.

While it is true that heater and godet design following the arrangement of FIG. 3 conceivably might be adjusted in respect to speed of rotation, length of roll, and number of poles to reduce the magnetic drag, nevertheless flexibility and diversity of use and control would be sacrificed, and the simple design of FIG. 4 is not only economically a vast improvement in its universal operating characteristics, but also much easier to design and manufacture.

With reference again to FIG. 1 it is to be noted that the construction of an induction heater according to the invention may be quite diversified merely by constructing components corresponding to those already described (for example, core portion 10, flange 12), and assembling them in different lengths; i.e., core portion 10 can be made in different lengths and used with common flanges 12, or flanges 13, which are identical. The inset portions of the flanges 12 and 13, permit such flexibility merely by using longer hollow rods 15 and 15a, together with longer screws 14.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

We claim:

1. A rotating heating device having an outer cylindrical conductive godet and means within said godet for inducing a current in said godet, the improvement in said means comprising a hollow spool having a central laminated magnetic core, the laminations of the core extending radially, a corresponding annular, laminated magnetic flange upon each end of the core, the laminations of the flanges being transverse of the core and the annular continuity of each flange being interrupted by a slot, and a winding upon the core between the said flanges.

2. The invention according to claim 1 wherein the radial laminations are spaced from one another more at the outer circumference of the core than at the inner circumference of the core.

3. The invention according to claim 2 wherein the means for spacing the said radial laminations comprises nodules formed adjacent to the outer edges of the laminations.

4. The invention of claim 1 with the further provision of hollow rods interspersing the core laminations and extending between the flanges and threaded screws through the rods extending beyond the flanges for clamping the flanges to the core.

5. The invention of claim 4 wherein the inner surfaces of the end flanges have circular, concentric insets conforming to the outside diameter of the core and into which the ends of the core are inserted.